T. J. LOVETT.
MACHINE FOR REDUCING ORES, &c.
APPLICATION FILED MAY 28, 1914.
1,175,966.
Patented Mar. 21, 1916.
4 SHEETS—SHEET 4.
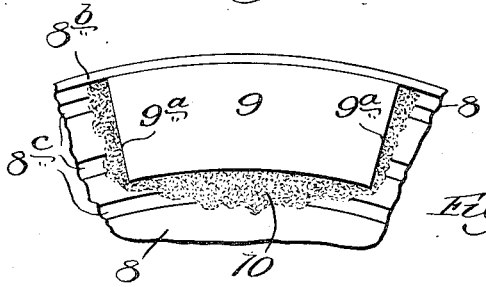
Fig. 5.
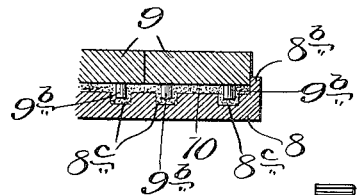
Fig. 6.
Fig. 4.
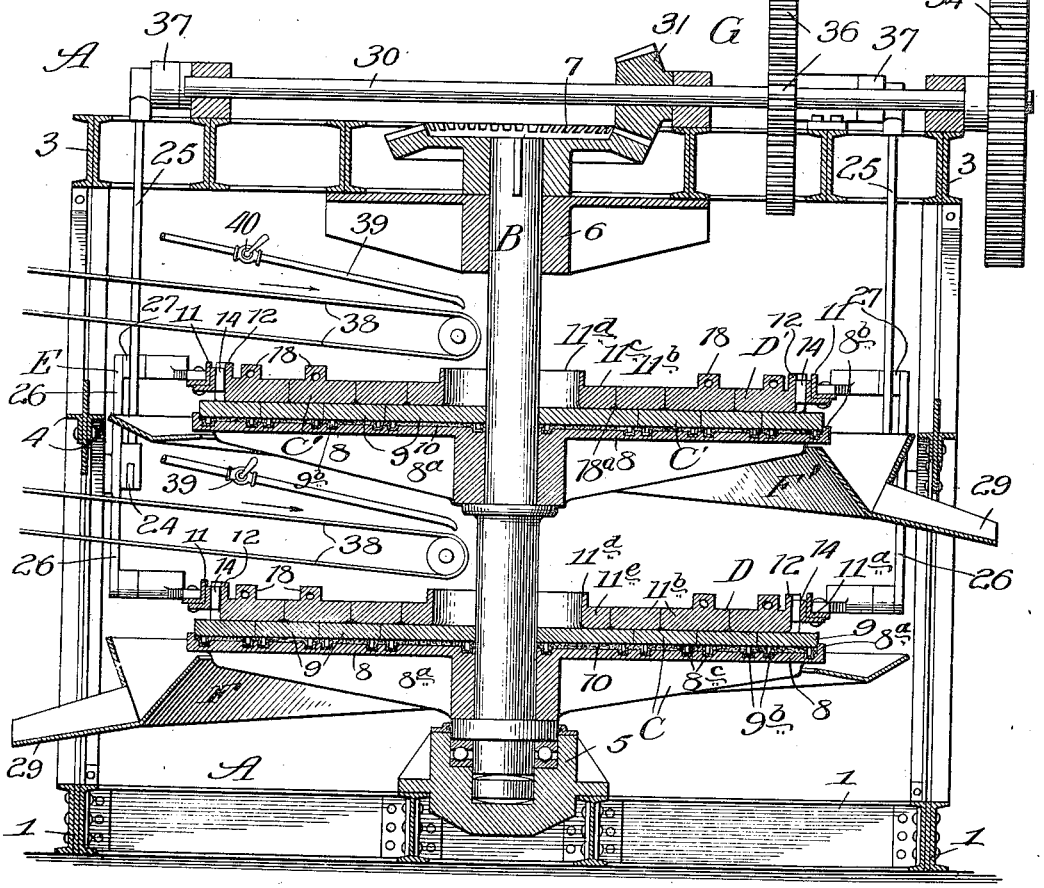
Witnesses:
E. E. Gaylord.
Irvin C. Bowman.
Inventor:
Thomas J. Lovett,
By Dyrenforth, Lee, Chritton & Wiles,
Attys.

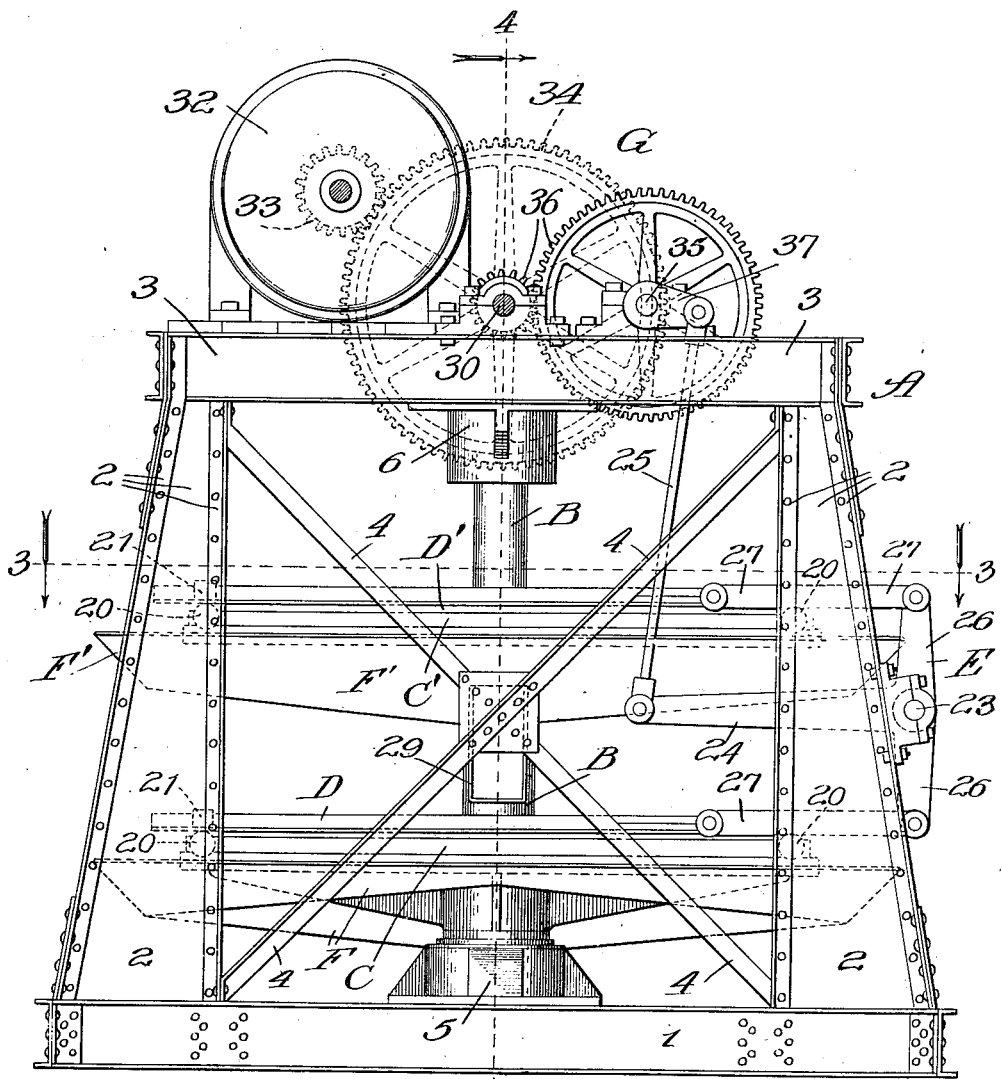

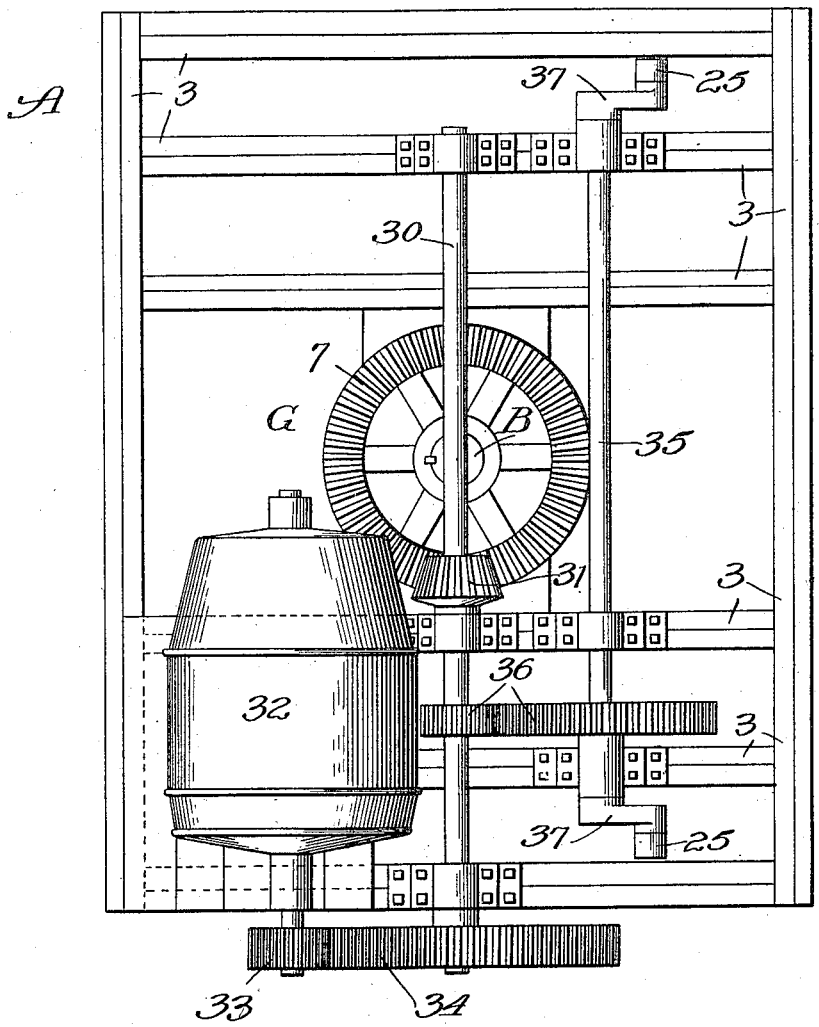

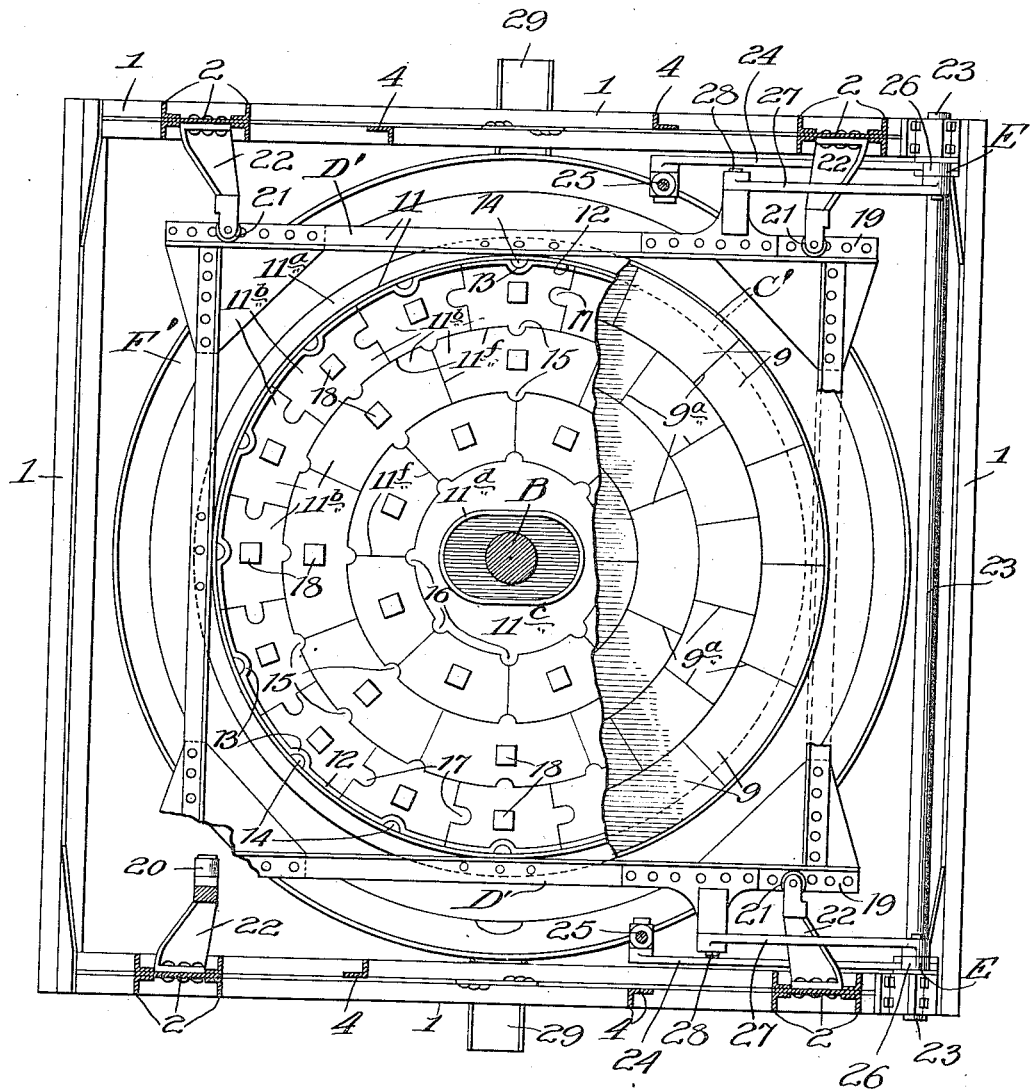

UNITED STATES PATENT OFFICE.

THOMAS J. LOVETT, OF CHICAGO, ILLINOIS, ASSIGNOR TO COPPER PROCESS COMPANY, OF CHICAGO, ILLINOIS, A CORPORATION OF SOUTH DAKOTA.

MACHINE FOR REDUCING ORES, &c.

1,175,966.   Specification of Letters Patent.   Patented Mar. 21, 1916.

Application filed May 28, 1914. Serial No. 841,459.

*To all whom it may concern:*

Be it known that I, THOMAS J. LOVETT, a citizen of the United States, residing at Chicago, in the county of Cook and State of Illinois, have invented a new and useful Improvement in Machines for Reducing Ores, &c., of which the following is a specification.

The present invention relates particularly to machines adapted for reducing materials, such as ore, to a finely-divided condition, while adapted, when free metal is present in the ore in finely-divided form, to roll the metal particles into slug, pellet or granular form. Such a machine is adapted, while reducing ores to a finely-divided state, to largely maintain the particles in granular form and to avoid excessive sliming, thereby obviating the great losses which are incident to fine-grinding machines in the standard practice. A machine operating upon the principle of the machine herein described is peculiarly valuable for treating ores containing free metals disseminated in fine condition through the rock, whether the free metals be native or whether they be produced by an artificial metallizing process.

The present invention constitutes an improvement upon the machine set forth in my application No. 731,455, filed November 14, 1912.

The primary object of the present invention is to provide a machine of large capacity, balanced parts, and economical operation.

The invention is illustrated in its preferred embodiment in the accompanying drawings, in which—

Figure 1 represents a side elevational view of the improved machine; Fig. 2, a plan view of the machine; Fig. 3, a broken plan section taken as indicated at line 3 of Fig. 1; Fig. 4, a vertical sectional view taken as indicated at line 4 of Fig. 1; Fig. 5, a fragmentary view of one of the rotary bed-plates and one of the wear-plates thereon; and Fig. 6, an enlarged broken vertical sectional view illustrating one way in which the lower wear-plates, or dies, may be mounted on the rotary bed-plate.

In the illustration given, A represents a frame upon which the operative parts are mounted; B, a large central vertical shaft journaled in the frame; C, C', rotary members secured, one above the other, upon the shaft B; D, D', reciprocating pressure-members surmounting the rotary members; E, mechanism for reciprocating the members D and D'; F, F', annular collecting-pans; and G, driving-mechanism for the moving parts referred to.

The frame A may be of any suitable construction. For a machine employing ten-foot rotary disks, the frame preferably has a base 1 which is approximately fourteen feet square, and from which rise corner-members 2, supporting the upper framework 3. The frame is shown stiffened by braces 4 located clear of the peripheral portions of the rotary members C, C'.

The shaft B should be of ample dimensions and suitably journaled to prevent vibration. As shown, its lower end is supported in a step-bearing 5, preferably provided with anti-friction means; and the upper end of the shaft extends through a bearing 6, above which bearing the shaft is equipped with a large bevel-gear 7, through the medium of which the shaft B is rotated.

Each of the rotary members C' comprises a bed-plate 8 having its lower side equipped with strengthening-ribs 8$^a$; and wear-plates or dies 9 mounted on the bed-plate and presenting a smooth, flat upper surface. It is preferred to make the wear-plates 9 of very hard or chilled cast-iron. The bed-plate 8 may be provided at its periphery with a low up-turned flange 8$^b$. The plates 9 preferably comprise a series of annular rows of plates, which, when placed together, completely fill the space between the flange 8$^b$ and the shaft. Each plate is therefore in the form of a section or segment of a ring, and the joints 9$^a$ between the lateral edges of the plates of each row are staggered with relation to the joints between the lateral edges of the plates of the adjacent row or rows. To facilitate placing the wear-plates 9 and obtaining a level upper surface, the bed-plate 8 has its upper surface provided with concentric milled grooves 8$^c$, upon the bottoms of which bear the milled lower ends of lugs 9$^b$ cast integrally with the lower portions of the wear-plates. This provision renders it unnecessary to mill the upper surface of the bed-plate and the lower surfaces of the wear-plates. A small intervening space may be left between the wear-plates and the bed-plate, which may be filled with lead or cement 10 in the manner shown in Fig. 6, if desired. It is understood, of course, that the rotary disks are wholly supported by the shaft B, according to the preferred construction.

Each of the reciprocating pressure-members D, D' preferably comprises a frame 11 having a circular member 11ª; several annular series of floating wear-plates 11ᵇ; and a central floating plate 11ᶜ having an opening therethrough and formed with an elongated hopper 11ᵈ. The wear-plates fit closely together, completely filling the space between the frame-ring 11ª and the central wear-plate 11ᶜ. Each wear-plate is in the form of a segment of a ring, and the joints 11ᶠ between the lateral edges of the wear-plates of each annular row are staggered with relation to the corresponding joints of the adjacent row or rows. The outer row of plates 11ᵇ have their outer peripheral portions equipped with up-standing flanges 12 and provided with central guide-recesses 13 which receive guide-lugs or keys 14 with which the inner surface of the angle-ring 11ª is equipped at proper intervals. The construction is such as to enable the plates to settle down to compensate for wear. The flanges 12 rise a sufficient distance so that they will remain in engagement with the upturned flange of the ring 11ª until the wear-plates are worn to a condition where they must be discarded.

Each wear-plate 11ᵇ of the outer row is provided at its inner edge with a short interlocking tongue or lug 15 which engages a corresponding recess or recesses in the intermediate annular row of plates. A similar interlocking arrangement exists between the plates of the intermediate annular row and the inner annular row. The inner edges of the inner annular row of plates are provided with recesses to accommodate interlocking lugs or tongues 16 with which the central or feed plate 11ᶜ is provided peripherally. It will be understood that by this arrangement the floating wear-plates of the reciprocating pressure and distributer-member (D or D', as the case may be) are interlockingly connected with the reciprocating frame 11, so that any tendency of the wear-plates, which rest upon the rotary members C, C', to turn with said rotary members is overcome. Nevertheless, the wear-plates of the reciprocating members are left free to adjust themselves to conditions in grinding. It is preferred to provide each of the outer row of plates 11ᵇ with a lateral tongue 17 which engages a corresponding vertical groove or recess in the adjacent edge of the adjacent plate. As has been indicated, the joints between the plates of the several rows are staggered, and the joints are further broken by the use of the tongues or lugs 17. The purpose is to prevent the passage of any material from the center of the machine to the periphery without being ground between the upper floating plates and the rotary members upon which they rest. The outer and inner lower corners of the floating plates are preferably rounded, or beveled, as indicated at 18ª, the purpose being to facilitate the passage of material under the plates, as the reciprocating member moves back and forth. The upper reciprocating distributer and pressure member, as thus described, presents practically a smooth continuous lower surface to the rotary member upon which it rests, thus enabling the ore to be reduced to a finely pulverulent condition, while the free metal particles contained in the ore are rolled together in slug, pellet or granular form and so enable a high saving to be effected by any suitable concentrating means. To enable the upper wear-plates to be handled, when discarding the worn out plates or providing new plates, the plates are provided on their upper surfaces with lugs 18 having perforations therethrough, enabling a bar to be inserted, or a grappling-hook to be applied. The frame 11 has its sides provided with straight members 19 which afford guides which rest upon rollers 20 and are confined between rollers 21 carried by brackets 22 extending inwardly from the sides of the frame. It is desirable to support the frame 11 clear of the rotary member, thus preventing the frame from wearing.

The mechanism E, which serves to reciprocate the members D and D', comprises a rock-shaft 23 operated by arms 24 through the medium of connecting-rods 25; and arms 26 extending above and below the shaft 23 and connected by links 27 to studs or wrist-pins 28 which project laterally from the members 19 of the frame 11, as shown in Fig. 3.

Each annular collecting-trough F, F' has a sloping bottom and is provided with a discharge-spout 29. The purpose is to collect the pulverized material as it is discharged over the peripheries of the disks; and, in the case of ores, the materials may then pass to a concentrating table, or through a concentrating-device.

The driving-mechanism G is shown as comprising a shaft 30 equipped with a pinion 31 meshing with the large bevel-gear 7; a motor 32 having a pinion 33 meshing with a gear 34 on the shaft 30; and a crank-shaft 35 driven from the shaft 30 by gears 36 and equipped at its ends with cranks 37 which actuate the connecting-rods 25.

The operation is as follows. Through the medium of the driving-mechanism G the vertical shaft B is caused to rotate the rotary members C, C'. The mechanism G, also, through the medium of the connecting-rods 25, actuates the mechanism E and reciprocates the upper pressure and distributer-members, which rest upon the rotating-disks.

The material to be pulverized, which is preparatorily crushed, is fed to the central hoppers 11ª, as by means of conveyers 38. In operating upon the harder ores, it is preferred to feed the materials to the machine, after they have first been reduced to approximately ten-mesh, or finer. Water, in limited quantities may be fed to the machine through pipes 39 controlled by valves 40. In the operation, the small pieces of ore are rolled or turned in ever-changing direction between the upper and lower pressure members, and the gangue is reduced to a very fine mesh, the materials, however, remaining largely in granular form and excessive sliming being avoided. In dealing with ores containing free metals in fine particles, such as copper-ores or free-milling gold ores, the fine particles of metal are rolled together in slugs or pellets and are discharged, with the finely pulverulent gangue, over the peripheral portions of the disks, after which the metals may be separated by any suitable concentrator. It is noteworthy that the materials are all caused to be ground between the reciprocating upper members and the rotary lower members, and direct passage of the ore-pieces through the peripheries of the disks is prevented by the arrangement of the flakes. The rate of feed may be regulated by the speed of the rotary members, and may be further regulated by the flow of water fed to the machine.

In dealing with brittle ores, and particularly the softer ores, the materials may be fed through the machine very rapidly, and the flakes may be made light enough to avoid sliming. Thus, it is possible to effect a higher degree of saving than has hitherto been possible.

The weight of the upper plates should be regulated according to the materials being treated. Weight-plates (none shown) may be added to the upper pressure-plates, from time to time, as the pressure-plates wear away. In dealing with quite hard copper-bearing rock in the Lake Superior region, I have found it desirable to employ a pressure in the neighborhood of one hundred pounds per square foot, and, in fact, have varied the pressure from about eighty pounds per square foot to one hundred and twenty pounds per square foot. In dealing with very soft ores, such as sulfids, a lighter pressure is usually desirable.

The improved machine possesses a very large capacity, floor-space considered; operates economically, and leaves the materials in the best form to effect a high saving. In the case of ores containing free metals in very fine particles the increased saving which can be effected by a machine operating upon this principle is especially marked, being, in some instances, double the saving which can be effected by methods in standard use. The machine is of balanced construction and operation, it being noted that the upper pressure member D moves in one direction while the other pressure-member D' moves in the opposite direction.

The foregoing detailed description has been given for clearness of understanding only, and no unnecessary limitation should be understood therefrom, but the appended claims should be construed as broadly as permissible in view of the prior art.

What I regard as new and desire to secure by Letters Patent is—

1. In a machine of the character set forth, the combination of a plurality of suitably-spaced rotary members disposed one above the other, co-acting reciprocable pressure-members comprising floating-plates resting upon said rotary members, and means for reciprocating said second-named members in opposite directions.

2. In a machine of the character set forth, the combination of a frame, a vertical shaft journaled therein, rotary members supported by said shaft and fixed to rotate therewith, a reciprocable pressure and distributing member co-acting with each rotary member and comprising floating-plates resting upon the rotary member, and means for shifting said reciprocable members with relation to the rotary members.

3. In a machine of the character set forth, the combination of a frame, a vertical shaft journaled therein, disks carried by said shaft and equipped with wear-plates, reciprocable plate-frames above said disks, guides for said plate-frames, floating plates within said frames and resting upon the wear-plates of said disks, means for feeding ore and water to the central portions of the disks, actuating mechanism for said plate-frames, and driving mechanism for the vertical shaft geared to said actuating mechanism.

4. In a machine of the character set forth, the combination of a lower rotary bed-plate, annular rows of wear-plates equipped on their lower surfaces with lugs bearing on the bed-plate, the radial joints between said wear-plates being staggered, an upper reciprocable pressure and distributer-member comprising a guide-supported frame, and floating pressure-plates therein having smooth, flat lower surfaces resting on said wear-plates, said reciprocable-member having a central feed-opening, means for feeding ore and water thereto, and means for rotating the lower member and reciprocating the upper member.

5. In a machine of the character set forth, the combination of a rotary member, a reciprocable pressure and distributer-member surmounting the same and comprising a guide-supported frame, independent floating pressure-plates within said frame having interlocking tongues and recesses, and means for actuating said members, for the purpose set forth.

6. In a machine of the character set forth, the combination of a rotary member, a guide-supported frame above the rotary member, means for reciprocating said frame, means for actuating the rotary member, and a plurality of series of independent pressure-plates having guide-connections with said frame and said series of plates having interlocking engagement with each other, for the purpose set forth.

7. In a machine of the character set forth, the combination of a main frame, a rotary member, means for actuating the rotary member, a reciprocable frame surmounting the rotary member, guides for the reciprocable frame, and a series of annular rows of independent pressure-plates within said reciprocable frame and resting upon said rotary member, the outer pressure plates having vertical guide-connections with the reciprocable frame, and the pressure-plates of the several rows having interlocking connections, for the purpose set forth.

8. In a machine of the character set forth, the combination of a main frame, a rotary member, a reciprocable frame, means for actuating the rotary member, means for reciprocating said second-named frame, an annular outer row of pressure-plates having vertical guide-connections with said reciprocable frame, and and adjacent annular row of independent pressure-plates having vertical tongue-and-groove-connections with the plates of the outer row.

9. In a machine of the character set forth, the combination of a main frame, a rotary member, a reciprocable frame, means for actuating the rotary member, means for reciprocating said second-named frame, an annular outer row of pressure-plates having vertical guide-connections with said reciprocable frame, and an adjacent annular row of pressure-plates having vertical tongue-and-groove-connections with the plates of the outer row, the joints between the lateral edges of the plates of one row being staggered with relation to the joints between the lateral edges of the plates of the adjacent row.

10. In a machine of the character set forth, the combination of a main frame, a rotary member, a reciprocating frame, a plurality of annular rows of pressure-plates within said reciprocable frame and resting on said rotary member, vertical guide-connections between the plates of the outer row and the reciprocable frame, vertical tongue-and-groove connections between the plates of the several rows, and a central hopper-equipped plate having vertical tongue-and-groove connections with the encircling inner row of plates.

11. In a machine of the character set forth, the combination of a main frame, a vertical shaft journaled therein, driving means connected with the upper end of said shaft, a pair of disks fixed to said shaft and equipped with wear-plates, a pair of reciprocable frames surmounting said disks, guides on the main frame supporting said reciprocable frames, means for reciprocating said frames, pressure-plates within said frames resting upon the wear-plates of said disks and provided with central feed-openings, and means for delivering materials to said central feed-openings.

THOMAS J. LOVETT.

In the presence of—
W. B. Dearborn,
O. C. Avisus.